(12) United States Patent
Ishikawa et al.

(10) Patent No.: US 9,033,593 B2
(45) Date of Patent: May 19, 2015

(54) OPTICAL MODULE

(71) Applicant: FURUKAWA ELECTRIC CO., LTD., Tokyo (JP)

(72) Inventors: Yozo Ishikawa, Tokyo (JP); Hideyuki Nasu, Tokyo (JP); Toshinori Uemura, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 13/961,775

(22) Filed: Aug. 7, 2013

(65) Prior Publication Data

US 2013/0322834 A1 Dec. 5, 2013

Related U.S. Application Data

(63) Continuation of application No. PCT/JP2012/052351, filed on Feb. 2, 2012.

(30) Foreign Application Priority Data

Feb. 8, 2011 (JP) ................................ 2011-025372

(51) Int. Cl.
*G02B 6/42* (2006.01)
*H04N 5/232* (2006.01)
*G02B 6/38* (2006.01)

(52) U.S. Cl.
CPC .......... *H04N 5/23219* (2013.01); *G02B 6/3897* (2013.01); *G02B 6/4261* (2013.01); *G02B 6/4256* (2013.01)

(58) Field of Classification Search
CPC ........................................................ G02B 6/42
USPC ........................................................ 385/92, 93
See application file for complete search history.

(56) References Cited

FOREIGN PATENT DOCUMENTS

| JP | 09-021931 A | 1/1997 |
| JP | 10-160966 A | 6/1998 |
| JP | 11-084174 A | 3/1999 |
| JP | 2004-246279 A | 9/2004 |
| JP | 2007-199461 A | 8/2007 |
| WO | 00/08503 A1 | 2/2000 |
| WO | 2006/123777 A1 | 11/2006 |

OTHER PUBLICATIONS

International Search Report corrsponding to PCT/JP2012/052351, dated Mar. 27, 2012.

*Primary Examiner* — Kaveh Kianni
(74) *Attorney, Agent, or Firm* — Lowe Hauptman & Ham, LLP

(57) ABSTRACT

An optical module which includes a housing having a placing portion and an optical input-output portion facing an optical input-output surface of a ferrule; a first fixing portion for fixing the ferrule to the housing in the direction of the Z-axis perpendicular to the placing portion; and a second fixing portion for fixing the ferrule to the housing in the direction of the Y-axis perpendicular to the optical input-output surface, wherein the second fixing portion can change states from the first state to the second state; the first fixing portion fixes the ferrule in the direction of the Z-axis, and does not fix the ferrule in the Z-axis direction when the first fixing portion is at a second position; and the first fixing portion moves from the second position to the first position when the second fixing portion changes its state to a specific state.

8 Claims, 11 Drawing Sheets

100

200

OPTICAL MODULE

RELATED APPLICATIONS

The present application is a continuation of International Application Number PCT/JP2012/052351, filed Feb. 2, 2012, and claims priority from, Japanese Application Number 2011-025372, filed Feb. 8, 2011. The above listed application is hereby incorporated by reference in its entirety.

FIELD OF THE INVENTION

The present invention relates to an optical module.

BACKGROUND OF THE INVENTION

A conventional method of removable optical connection between an optical module and an optical fiber by fitting an optical module with an optical connector is known. As a fitting method, there is one that an optical connector is sandwiched by halved housings from upper and lower sides, the housings are mutually fitted using male and female engagement means, and coiled springs provided in one of the housings push the optical connector in the direction of the joint end face (for example, refer to Patent Document 1).

PRIOR ART DOCUMENT

Patent Document

[Patent Document 1] Japanese Unexamined Patent Application Publication No. H10-160966 (JP-A-H10-160966)

SUMMARY OF THE INVENTION

Problem(s) to be Solved by the Invention

However, since the optical connector is sandwiched by housings from the upper and lower sides in the conventional fitting method, thickness in the vertical direction becomes large, and it is hard to realize to be thinner. Also, since the housing has coiled springs for pushing the optical connector in the direction of the optical axis, the size of the housing increases in the direction of the optical axis and it is hard to downsize the optical connector. Moreover, since reproducibility of the connection is bad with concavo-convex engagement means, it is impossible to obtain sufficient optical connection with good reproducibility.

Means for Solving the Problem(s)

To solve the above-mentioned problems, the first aspect of the present invention provides an optical module which combines a circuit board with an optical fiber through a ferrule, comprising: a housing comprising a placing portion on which the ferrule is placed and an optical input-output portion facing an optical input-output surface of the ferrule; and a fixing member for fixing the ferrule to the housing, wherein the fixing member comprises: two wall portions, which are provided perpendicularly to a placing surface of the placing portion, which extend parallel to each other in the direction of the Y-axis perpendicular to the optical input-output surface of the ferrule, and which face mutually; bridge portions, which extend parallel to the placing surface and perpendicularly to the direction of the Y-axis, and which connect together the upper ends of the two wall portions; supporting portions which extend from the bottom end of each of the wall portions toward the opposite wall portion; second pressing portions for pressing the ferrule onto the optical input-output portion in the direction of the Y-axis; and contact portions which extend from the inward surface of each of the wall portions toward the opposite wall portions, and the housing comprises: first grooves in which the supporting portions are inserted; and second grooves formed at the positions corresponding to the contact portions, wherein: the first grooves and the second grooves are formed, penetrating the housing in the direction of the Z-axis perpendicular to the placing surface and alongside in the direction of the Y-axis; the distance between the first groove and the second groove enables the supporting portions and the contact portions to pass through the grooves at the same time; the fixing member is movable in the direction of the Y-axis with respect to the housing; when the supporting portions are inserted in the first grooves from above, at least parts of the supporting portions contact with the lower surface of the placing portion; and the contact portions contact with the wall surfaces of the second grooves, and thus, the second pressing portions and the contact portions fix the fixing member to the housing in the direction of the Y-axis.

The above-mentioned summary of the invention does not enumerate all the required features of the present invention. Sub-combinations of these features can also be inventions.

DESCRIPTION OF EMBODIMENTS

Hereinafter, the present invention will be explained through embodiments of the invention by referring to attached drawings. However, following embodiments do not limit the invention according to claims. Also, not all the combinations of the features described in the embodiments are necessary for solving problems of the invention.

Figure 1:
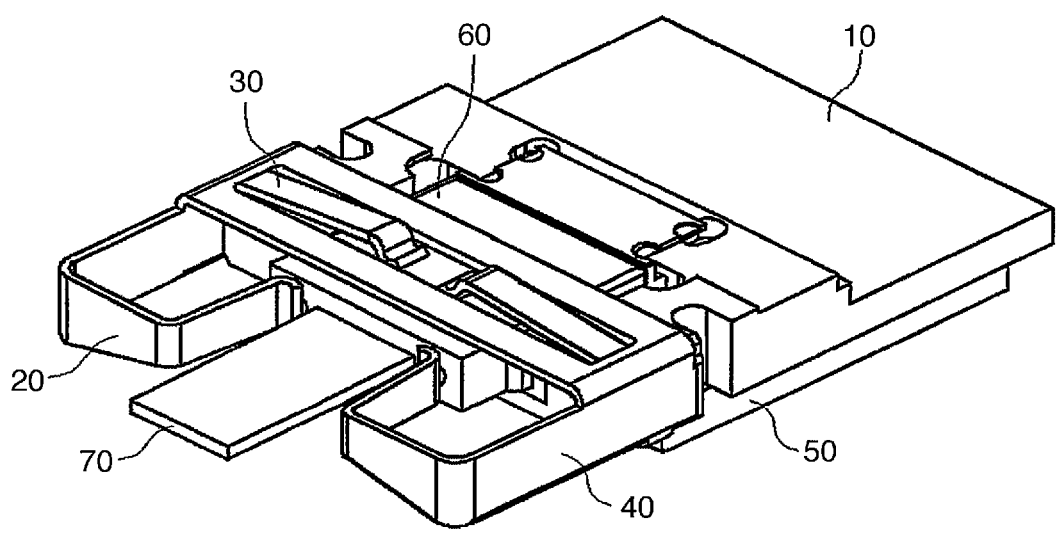
FIG. 1 is a perspective view of an optical module according to the first embodiment of the present invention.

FIG. 1 shows an optical module 100 according to the first embodiment of the present invention. The optical module 100 includes a circuit board 50, a housing 10 mounted on the circuit board 50, an optical fiber 70 for transmitting optical signals through a ferrule 60, and a fixing member 40 for fixing the ferrule 60 to the housing 10 in attachable and detachable way.

Laser modules, including light emitting elements such as semiconductor lasers and the like or light receiving elements such as photo-diodes and the like may be mounted on the circuit board 50. The semiconductor laser may be a surface-emitting semiconductor laser, and the photo-diode may be a pin photo-diode. Thickness of the circuit board is about 1.5 mm, for example.

The housing 10 may be made from ceramics. Thickness of the housing 10 may be about several millimeters at the thickest portion. Thickness of the ferrule 60 is less than 1.6 mm. The fixing member 40 has first pressing portions 30 and second pressing portions 20 which will be described later. The fixing member 40 is formed by processing a metal tabular member about 0.2 mm thick. The material metal of the fixing member 40 may be aluminum alloy, copper alloy, stainless steel, etc.

The optical module 100 combines the circuit board 50 with the optical fiber 70 through the ferrule 60. That is, the optical module 100 carries out light/electricity connection between the circuit board 50 and the optical fiber 70 in a removable way, by converting electric signals of the circuit board 50 to light and providing it to the optical fiber 70 through the ferrule 60, and converting light signals from the optical fiber 70 to electric signals and providing it to elements of the circuit board 50.

Figure 2:
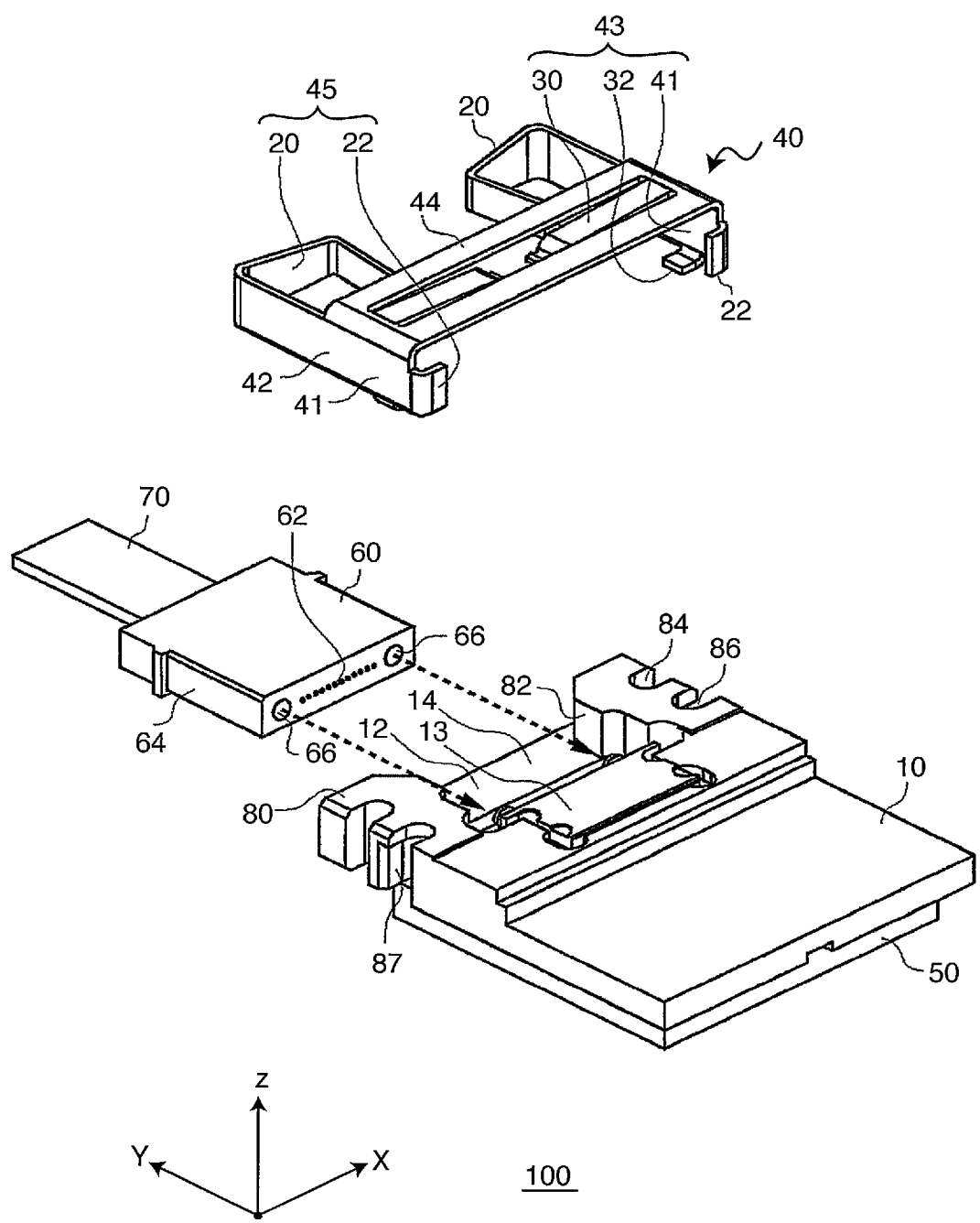
FIG. 2 is an exploded view of the optical module shown in FIG. 1.

FIG. 2 is an exploded view of the optical module 100. The ferrule 60 has an optical input-output surface 62 for inputting and outputting light signals transmitted through the core portion of the optical fiber 70. The normal direction to the optical input-output surface 62 is set to be the direction of the Y-axis in FIG. 2 and the normal direction of a placing surface 13 which will be described later is set to be the direction of the Z-axis. Also, the direction perpendicular to both the Y-axis and the Z-axis is set to be the direction of the X-axis. The ferrule 60 has at least two guide holes 66 provided on the optical input-output surface 62. The guide holes 66 mate to guide pins 18 which will be described later and position the ferrule 60. The ferrule 60 has side surfaces 64 whose normal direction is the X-axis.

The housing 10 has a placing portion 12 on which the ferrule 60 is placed. The placing portion 12 may be a thin, approximately rectangular tabular member provided at the optical fiber 70 side end of the housing 10. The placing portion 12 may be provided such that its lower surface is on the same plane as the lower surface of the housing 10. The thickness of the placing portion 12 in the direction of the Z-axis is thinner than that of the region of the housing 10 in which an optical input-output portion 14, which will be described later, is provided. The placing portion 12 may have approximately the same width as the housing 10 has, in the direction of the X-axis.

The placing portion 12 has a placing surface 13 for supporting the ferrule 60. The Y-axis is normal to the placing surface. The housing 10 has an optical input-output portion 14 which faces the optical input-output surface 62 of the ferrule 60. The optical input-output portion 14 is fixed to the housing 10. The optical input-output portion 14 transmits and receives light signals between the optical input-output surface 62 of the ferrule 60 and the circuit board 50.

The housing 10 has guide portions 80 which guide side surfaces 64 of the ferrule 60 in the direction of the Y-axis. The guide portions 80 may be block-shaped members which extend toward the optical fiber 70 from the surface of the housing 10 facing the ferrule 60. The guide portions 80 are provided on both X-axis direction ends of the placing portion 12, facing mutually. Each guide portion 80 includes a guide surface 82 parallel to the direction of the Y-axis and perpendicular to the placing surface 13. When the ferrule 60 is placed on the placing portion 12, the guide surfaces 82 may contact with the side surfaces 64 of the ferrule 60.

The guide portion 80 has a first groove 84 and a second groove 86 both of which penetrate in the direction of the Z-axis from the upper surface to the lower surface of the guide portion 80. The upper surface of the guide portion 80 refers to the surface of the guide portion 80 opposite to the surface contacting with the placing portion 12. The lower surface of the guide portion 80 refers to the surface contacting with the placing portion 12 of the guide portion 80. The first groove 84 and the second groove 86 may be formed at the outside end of the guide portion 80 and may be through holes with u-shaped cross sections. The "outside end" refers to the end of the guide portion 80 opposite to the surface facing the other guide portion 80.

The first groove 84 and the second groove 86 are located alongside in the direction of the Y-axis. The distance between the first groove 84 and the second groove 86 may be approximately equal to the distance between a supporting portion 32 and a contact portion 22, which will be described later, in the direction of the Y-axis. "Approximately equal" means that two distances are equal to such an extent that the supporting portion 32 and the contact portion 22 can pass through the first groove 84 and the second groove 84 respectively at the same time, when the fixing member 40 is mounted onto the guide portions 80 from above.

The first groove 84 is formed by penetrating further through the placing portion 12. Accordingly, the first groove 84 is formed in both the guide portion 80 and the placing portion 12. The second groove 86 may be formed in the region of the guide portion 80 that is placed on the circuit board 50. The second groove 86 does not penetrate the circuit board 50. Also, the second groove 86 may be formed from the upper surface of the guide portion 80 to the middle of the guide portion 80. That is, the second groove 86 may not penetrate the guide portion 80.

The widths of the first groove 84 and the second groove 86 may differ mutually in the direction of the Y-axis. The width of the first groove 84 is larger than the width of the supporting portion 32 and the width of the second groove 86 is larger than the width of the contact portion 22. The second groove 86 has a wall surface 87 on the optical fiber 70 side. The wall surface 87 may be a flat surface normal to the Y-axis.

The fixing member 40 has a first fixing portion 43 and a second fixing portion 45. The first fixing portion 43 fixes the ferrule 60 to the housing 10 in the direction of the Z-axis normal to the placing surface 13. The second fixing portion 45 fixes the ferrule 60 to the housing 10 in the direction of the Y-axis.

The first fixing portion 43 has a substrate 41, first pressing portions 30, and supporting portions 32. The substrate 41 includes two wall portions 42 and bridge portions 44 which connect the two wall portions 42. The substrate 41 is composed of rigid material and gives rigidity to the fixing member 40. The two wall portions 42 are provided perpendicularly to the placing surface 13, extend parallel in the direction of the Y-axis, and face mutually. The bridge portions 44 are parallel to the placing surface 13, extend perpendicularly to the Y-axis, and connect the two wall portions 42 at the upper end of the wall portions 42.

The first pressing portions 30 are provided on the substrate 41 and press the ferrule 60 from the opposite side of the placing surface 13. The first pressing portions 30 may be two blade springs. The blade springs have elastic force for pressing the ferrule 60 onto the placing surface 13. Each blade spring is fixed to the upper end of the corresponding wall portion 42 of the substrate 41 at one end and extends toward the opposite part of the substrate 41. The other end of the blade spring which is not fixed to the substrate 41, presses the ferrule 60 toward the placing surface 13.

The substrate 41 has two bridge portions 44. The two blade springs are provided between the two bridge portions 44 facing mutually. The ends of the blade springs which presses the ferrule 60 are located lower than the upper surface of the bridge portions 44 in the direction of the Z-axis before the fixing member 40 is mounted on the housing 10.

The supporting portion 32 extends from the lower end of each wall portion 42 toward the opposite wall portion 42. The distance between the upper surface of the supporting portion 32 extending toward the opposite wall portion 42 and the lower end of the wall portion 42 in the direction of the Z-axis may be approximately the same as the thickness of the placing portion 12 in the direction of the Z-axis. The supporting portions 32 may include two standing L-shaped portions provided on the substrates 41. One end of the standing L-shaped portion is fixed to the lower end of the wall portion 42 of the substrate 41 on the opposite side to the optical fiber 70, and the other end supports the lower surface of the placing portion 12. The two standing L-shaped portions extend in the direction of the Z-axis to leave the bottom of wall portion 42 from the bottom of the wall portion 42, and then change the direction to approach the opposite wall portion 42. The two supporting portions 32 may be provided facing mutually. The two standing L-shaped portions extend about 1 mm to 5 mm from the wall portions 42 toward the Y-axis.

The second fixing portion 45 has second pressing portions 20 and contact portions 22. The second pressing portions 20 are provided on the substrate 41 and press the ferrule 60 onto the optical input-output portion 14 in the direction of the Y-axis. The second pressing portions 20 have a first state pressing the ferrule 60 onto the optical input-output portion 14 in the direction of the Y-axis and a second state not pressing the ferrule 60 onto the optical input-output portion 14. The second pressing portions 20 may include two springs provided on each substrate 41. Each spring may be formed on the corresponding substrate 41 becoming line symmetry with respect to the median line of the two substrates 41.

The second pressing portion 20 in this embodiment extends from the end of each wall portion 42 opposite to the contact portions 22 in the direction of the Y-axis, and then extends toward the opposite wall portion 42, and further extends in the direction of the Y-axis approaching the contact portion 22. However, the shape of the second pressing portion 20 is not limited to this shape. Each of the two springs is fixed to the rear end of the corresponding wall portion 42 of the substrate 41 at one end and presses the ferrule 60 in the Y-axis direction with the other end. The "rear end of the wall portion 42" refers to the end of the side surface of the wall portion 42 on the side of the optical fiber 70.

The contact portions 22 contact with the housing 10 when the second pressing portions 20 are in the first state, and fix the second fixing portion 45 to the housing 10. For example, in a case where the second pressing portions 20 are in the first state and press the rear end of the ferrule 60 in the first direction, i.e. the direction toward the optical input-output portion 14, the contact portions 22 press the housing 10 in the direction opposite to the first direction and fix the second fixing portion 45.

The contact portion 22 extends from an inward surface of the wall portion 42 toward the opposite wall portion 42. The "inward surface" refers to a surface that faces the surface of the other wall portion 42. The contact portion 22 in this embodiment extends from the end close to the optical input-output portion 14 out of two ends of the wall portion 42 in the direction of the Y-axis. Also, the distance between the inward surfaces of the two wall portions 42 is approximately equal to the distance between two end surfaces of the two guide portions 80 in which grooves are formed.

The contact portions 22 include two lying L-shaped portions formed on each substrate 41 with line symmetry to the median line of the two substrates 41. Each lying L-shaped portion extends from the end of the wall portion 42 in the direction of the Y-axis leaving the end of the wall portion 42, and then extends in the direction toward the opposite wall portion 42. The two lying L-shaped portions extend about 1 mm to 5 mm from the wall portions 42 toward the opposite wall portions 42.

The first fixing portion 43 and the second fixing portion 45 are formed on the common substrate 41. By changing its state from the second state to the first state, the second pressing portion moves the substrate 41 in the direction of the Y-axis with respect to the placing portion 12. For example, when the second pressing portions 20 press the rear end of the ferrule 60, the reaction force moves the substrate 41 in the direction opposite to the pressing direction. The first fixing portion 43 moves from the second position to the first position as the substrate 41 moves. Also, the first fixing portion 43 and the second fixing portion 45 may be formed of a sheet of metal plate by the press processing using a metal mold or the like.

Figure 3:
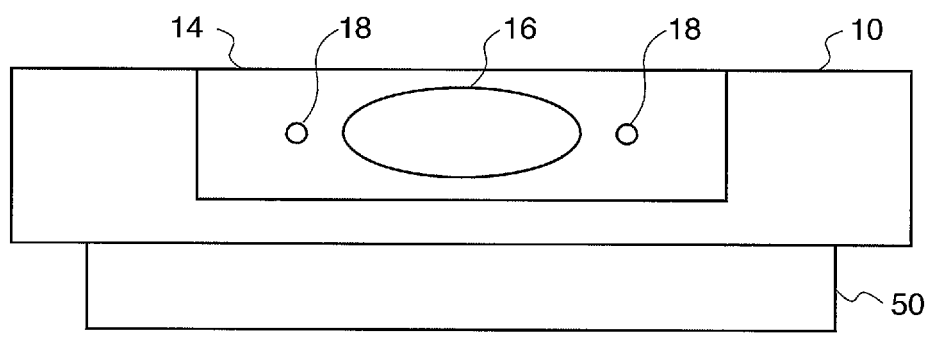
FIG. 3 is a cross-sectional view of the optical module shown in FIG. 1 seen from the side of the connected optical fiber.

FIG. 3 is a cross-sectional view of the housing 10 seen from the side of the optical fiber 70. The housing 10 has the optical input-output portion 14 facing the optical input-output surface 62 of the ferrule 60. The optical input-output portion 14 has a lens 16 to input and output light between the lens 16 and the optical input-output surface 62 of the ferrule 60. The lens 16 has the size and shape corresponding to the optical input-output surface 62 of the ferrule 60. The lenses 16 may be provided for each of channels of the ferrule 60. The lens 16 may be made from silica glass.

The optical input-output portion 14 has at least two guide pins 18. Each guide pin 18 engages with corresponding guide hole 66 of the ferrule 60, respectively. The guide pin 18 is positioned on the optical input-output portion 14 so as to be inserted in the guide hole 66 of the ferrule 60. The diameter of the guide pin 18 is approximately 0.7 mm, for example. Also, the length of the guide pin may be less than 1 mm. The guide pin 18 may be made from silica glass. The lens 16 and the guide pins 18 may be formed in one. The lens 16 and the guide pin 18 are formed, for example, by an injection molding using metal mold.

In this embodiment, the length of the guide pin 18 is shorter than the length of the guide pin of conventional optical connectors. That is, in the case of conventional MT connectors, the length of the guide pin was required to be more than 2 mm to stabilize connection. In this embodiment, the fixing member 40 fixes the ferrule 60 to the housing 10 with its elastic force in the direction of the Y-axis and also in the direction perpendicular to the Y-axis. This enables to make the length of the guide pin 18 shorter than guide pins of the conventional optical connectors. Thus, it is easier to make the lens 16 and the guide pins 18 in one.

Figure 4:
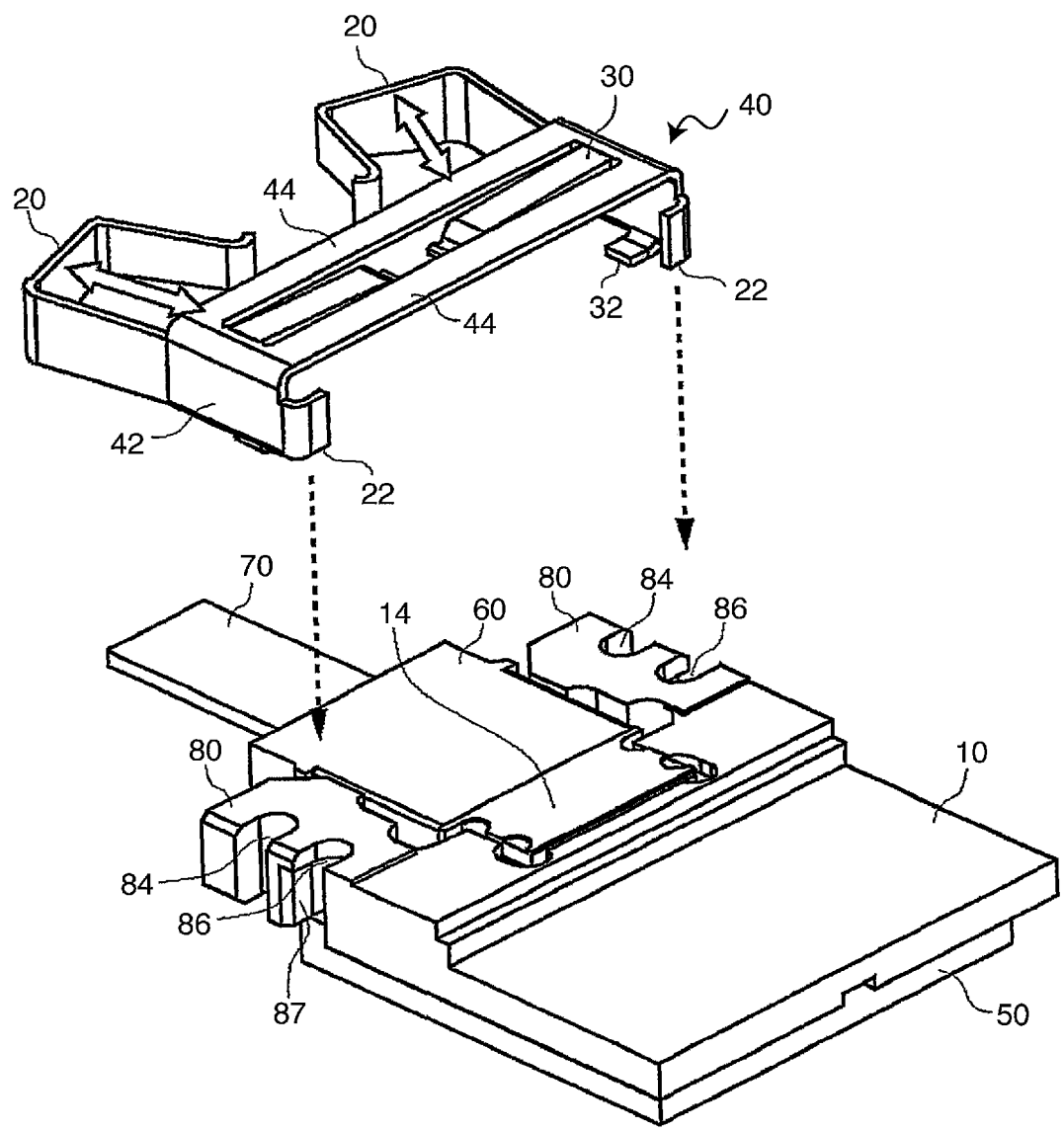
FIG. 4 is a perspective view showing the first process of assembling the optical module shown in FIG. 1.

FIG. 4 shows the first process of assembling the optical module 100. The ferrule 60 is guided by the guide portions 80 of the housing 10 and placed on the placing portion 12. The guide pin 18 is inserted in the guide hole 66 of the ferrule 60 and the ferrule is positioned with respect to the housing 10.

The second pressing portions 20 are bent in the direction opposite to the pressing direction using a jig to take the second state. In this state, the fixing member 40 is mounted on the housing 10 (the guide portions 80). As described above, the distance between the first groove 84 and the second groove 86 is approximately equal to the distance between the supporting portion 32 and the contact portion 22. Therefore, the supporting portion 32 and the contact portion 22 can be inserted in the first groove and the second groove 86 respectively. In the state where the fixing member 40 is mounted on the housing 10, the supporting portion 32 passed through the first groove 84 and is located at the lower surface side of the placing portion 12. The contact portion 22 is located in the second groove 86.

The guide portion 80 has the first groove 84 at the position corresponding to the supporting portion 32 when the first fixing portion 43 is at the second position. The second position refers to the position of the fixing member 40 in the direction of the optical axis at the time when the fixing member 40 is mounted on the housing 10 but before the fixing member 40 fixes the ferrule 60 to the housing 10. The guide portion 80 has the second groove 86 at the position corresponding to the contact portion 22 when the first fixing portion 43 is at the second position.

Figure 5:
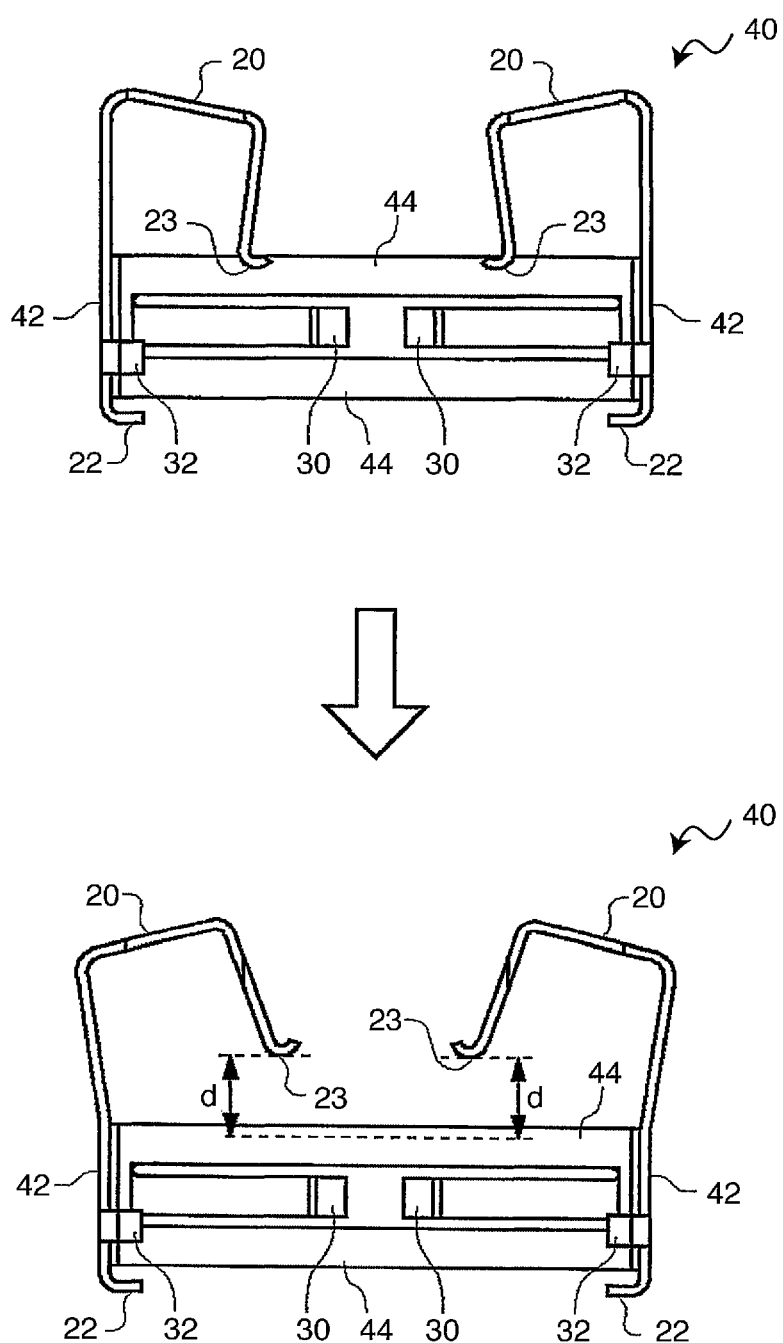
FIG. 5 are plan views showing the lower surfaces of the fixing member of the optical module shown in FIG. 1.

FIG. 5 show the lower surfaces of the fixing member 40. FIG. 5 show the cases where the second pressing portions 20 are in a first shape and a second shape. The positions of tips 23 of the second pressing portions 20 in the direction of the Y-axis move by a distance d, when the shape of the second pressing portions 20 changes from the first shape to the second shape. This distance d is called "a spring stroke". The spring stroke d may be approximately 2 mm.

In the present embodiment, the spring stroke d of the second pressing portion 20 can be taken longer. Therefore, the ferrule 60 can be pressed to the housing with a stronger elastic force. Thus, optical connection between the optical input-output surface 62 of the ferrule 60 and the optical input-output portion 14 of the housing 10 is stabilized. As a result, optical connection loss decreases and connection reproducibility improves.

Figure 6:
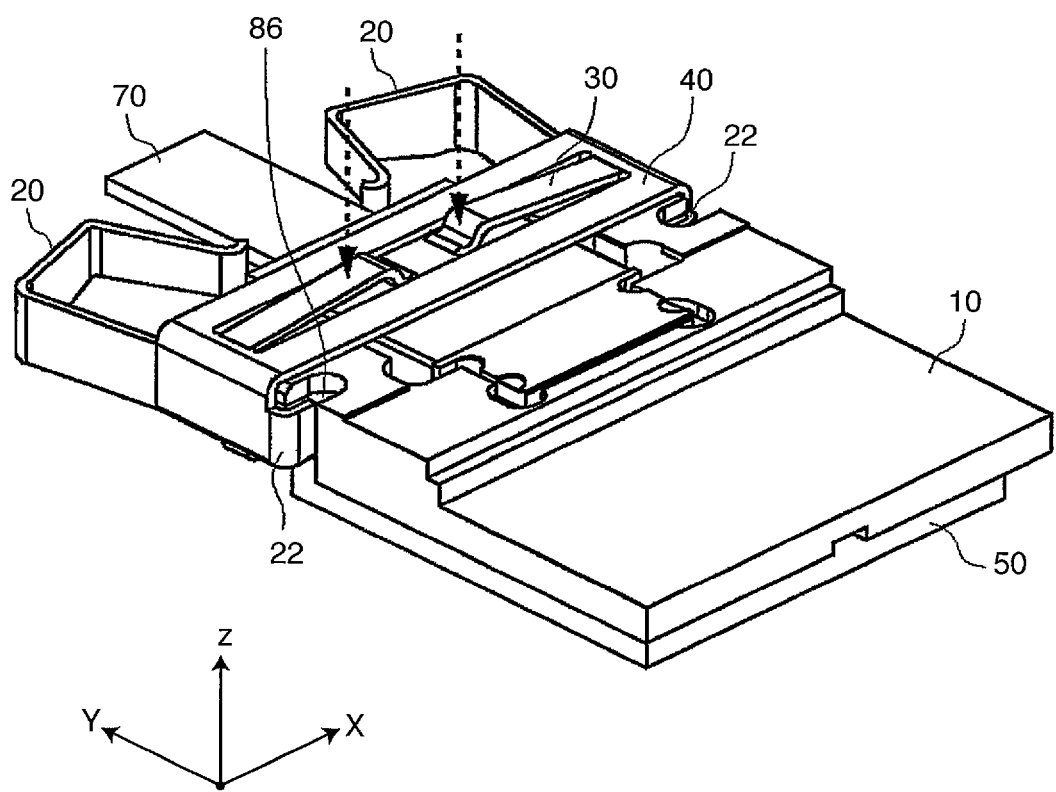
FIG. 6 is a perspective view showing the second process of assembling the optical module shown in FIG. 1.

FIG. 6 shows the second process of assembling the optical module 100. The fixing member 40 is mounted on the housing 10 while the second pressing portions 20 are held in the second state by jigs. As described above, the supporting portion 32 passes through the first groove 84 and the contact portion 22 is held inside of the second groove 86.

At this moment, the first fixing portion is located at the second position in the direction of the Y-axis. The first pressing portions 30 press the ferrule 60 in the direction of the Z-axis. However, the first fixing portion 43 does not fix the ferrule 60 in the direction of the Z-axis, since the supporting portions 32 are at the positions of the first grooves 84 and do not contact with the lower surface of the placing portion 12.

When the second pressing portions 20 are in the second state, the tips 23 of the second pressing portions 20 do not press the rear end of the ferrule 60 in the direction of the Y-axis, and the contact portions 22 do not contact with the wall surfaces 87 of the second grooves 86. That is, there is a gap between the wall surfaces 87 and the contact portions 22 when the second pressing portions 20 are in the second state. The gap may be less than 1 mm.

Figure 7:
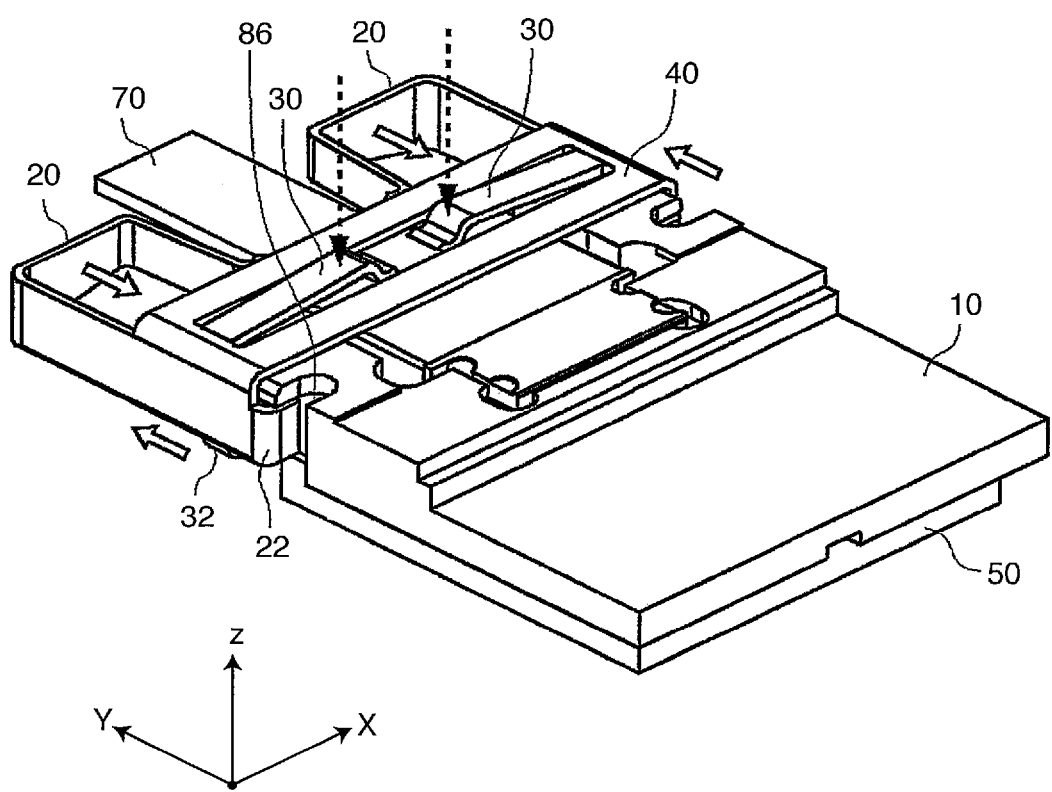
FIG. 7 is a perspective view showing the third process of assembling the optical module shown in FIG. 1.

FIG. 7 shows the third process, the final process of assembling the optical module 100. When the jigs are removed, the state of the second pressing portions 20 changes from the second state to the first state. At this moment, the tips 23 of the second pressing portions 20 press the rear end of the ferrule 60 in the direction of the Y-axis with restoring forces of the springs. Accordingly, the whole fixing member 40 slides away from the housing 10 in the direction of the Y-axis. Thus, the first fixing portion 43 moves from the second position to the first position.

When the fixing member 40 slides in the direction of the Y-axis, the contact portion 22 comes to contact with the wall surface 87 of the second groove 86. As a result, the ferrule 60 is fixed in the direction of the Y-axis by the second pressing portions 20 and the contact portions 22.

Also, the supporting portions 32 come to support the lower surface of the placing portion 12, when the first fixing portion 43 moves from the second position to the first position in the direction of the Y-axis. The first pressing portions 30 press the ferrule 60 onto the placing surface 13 in the direction of the Z-axis. As a result, the ferrule 60 is fixed by the first pressing portions 30 and the supporting portions 32 in the direction of the Z-axis.

Figure 8:
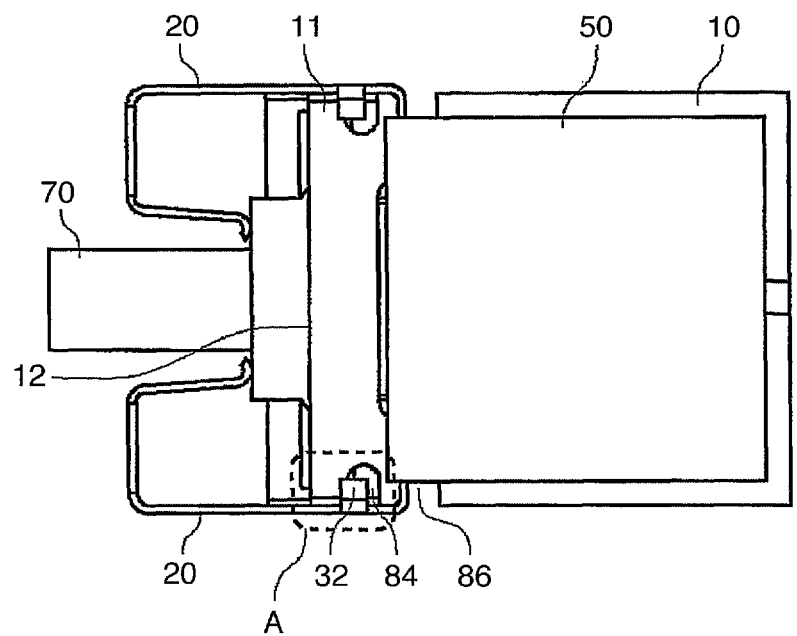
FIG. 8 are rear views after assembling the optical module shown in FIG. 1.
Figure 8:
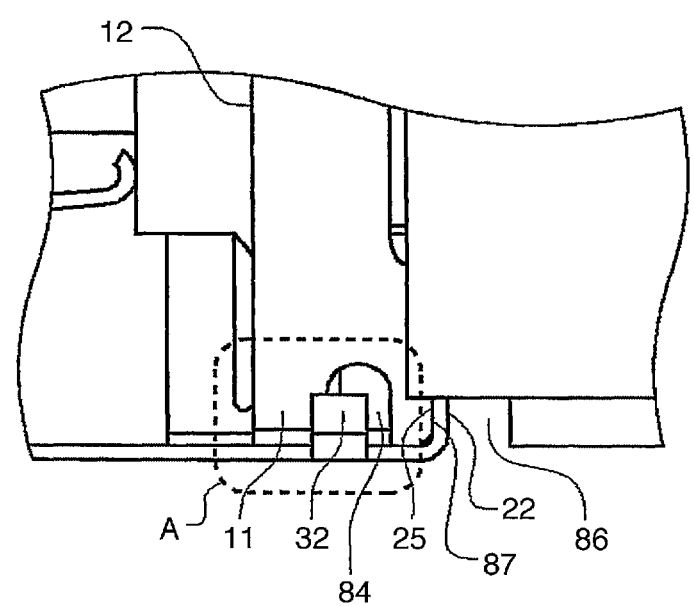

FIG. 8 are rear views after assembling the optical module 100, showing the whole lower surface and an enlarged view of region A of the optical module 100. The placing portion 12 includes a flat lower surface 11 which contacts with the supporting portions 32. The placing portion 12 has the first grooves 84 at the position where the supporting portions 32 stay when the first fixing portion 43 is at the second position on the lower surface of the placing portion 12. The first groove 84 prevents the supporting portion 32 from contacting with the lower surface of the placing portion 12, when the first fixing portion 43 is at the second position.

When the first fixing portion 43 moves to the first position, at least parts of supporting portions 32 leave the regions of the first grooves 84 and contact with the lower surface of the placing portion 12. Therefore, the supporting portions 32 support the lower surface 11 of the placing portion 12. The supporting portions 32 may support the regions of the lower surface 11 at the edge of the first grooves 84. By such structure, the fixing member 40 fixes the ferrule 60 in the both directions of the Y-axis and the Z-axis, corresponding to the change of the shape of the second pressing portions 20. Therefore, the ferrule 60 can be fixed by easy operation, and the fixing member 40 can have a simple structure.

As described above, the contact portions 22 contact with the wall surfaces 87 of the second grooves 86 when the second pressing portions 20 are in the first state. The contact portion 22 has a flat contact surface 25 on its optical fiber side. The wall surface 87 of the second groove 86 is a flat surface perpendicular to the Y-axis.

According to the optical module 100 according to the first embodiment, the ferrule 60 is fixed in the direction of the X-axis by the two guide portions 80, in the direction of the Z-axis by the first pressing portions 30 and the supporting portions 32, and in the direction of the Y-axis by the second pressing portions 20 and the contact portions 22. Therefore, the ferrule 60 is stably fixed to the housing 10.

Figure 9:
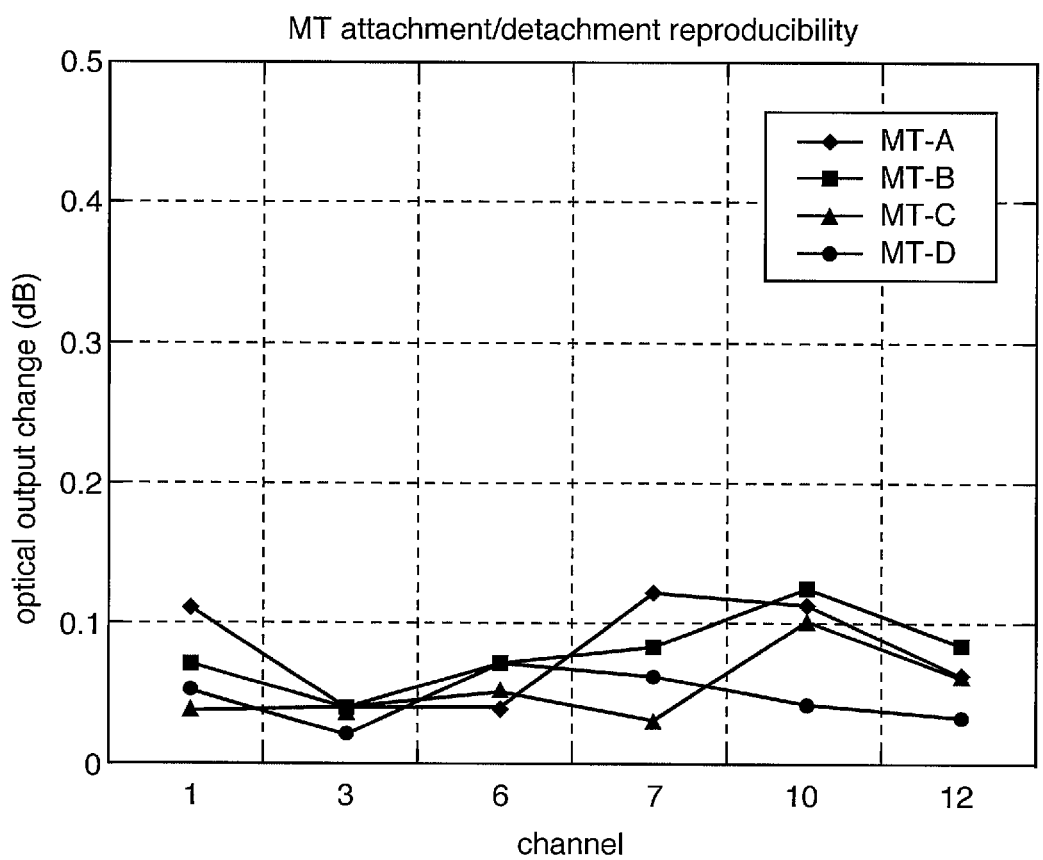
FIG. 9 is a graph showing the result of an experiment which examined the attachment/detachment reproducibility of the ferrule in the optical module shown in FIG. 1.

FIG. 9 is a graph showing a result of an experiment which examined the attachment/detachment reproducibility of the ferrule 60 in the optical module 100. A twelve core ferrule was used for the experiment as the ferrule 60. Four ferrules MT-A, MT-B, MT-C, and MT-D of the same kind were used for the experiment. Change in the optical output of each channel before and after attachment/detachment of the ferrules was measured.

The graph shows that the optical output change of any ferrule from A to D is smaller than 0.12 dB. From this experimental result, it can be said that the optical connection loss of the optical module 100 according to this embodiment is small and its connection reproducibility is very high.

According to the first embodiment, a thin and small optical module having excellent optical connection reproducibility can be provided. Also, an optical module having few parts and good workability can be obtained. Moreover, its manufacturing cost can be kept low, since the fixing member formed in one is used.

Figure 10:
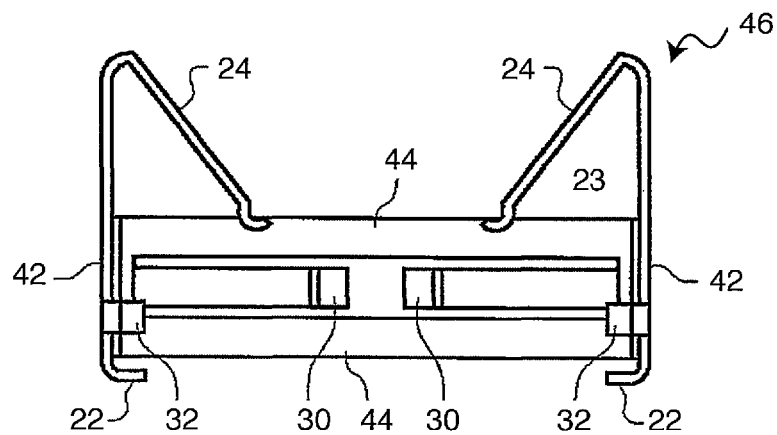
FIG. 10 is a top view showing the first modification of the fixing member of the optical module shown in FIG. 1.

FIG. 10 shows a fixing member 46, which is the first modification of the fixing member 40. The shape of the second pressing portion 24 in the fixing member 46 differs from the shape of the second pressing portion 20 shown in FIG. 2. The second pressing portion 24 extends from the rear end of the wall portion 42 in the direction of the Y-axis, then bends and extends toward the contact portion 22 and the opposite wall portion 42. The bent parts may take the form of acute angles.

Figure 11:
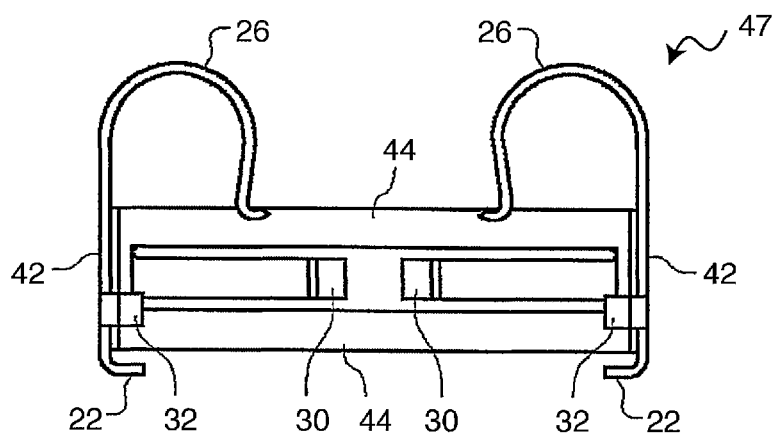
FIG. 11 is a top view showing the second modification of the fixing member of the optical module shown in FIG. 1.

FIG. 11 shows a fixing member 47, which is the second modification of the fixing member 40. The shape of the second pressing portion 26 in the fixing member 47 differs from the shape of the second pressing portion 20 shown in FIG. 2. One end of the second pressing portion 26 is fixed to the rear end of the wall portion 42 and the other end presses the rear end of the ferrule 60 in the direction of the Y-axis. A curved portion having a shape of a semi-circle, is formed between both ends of the second pressing portion 26.

Figure 12:
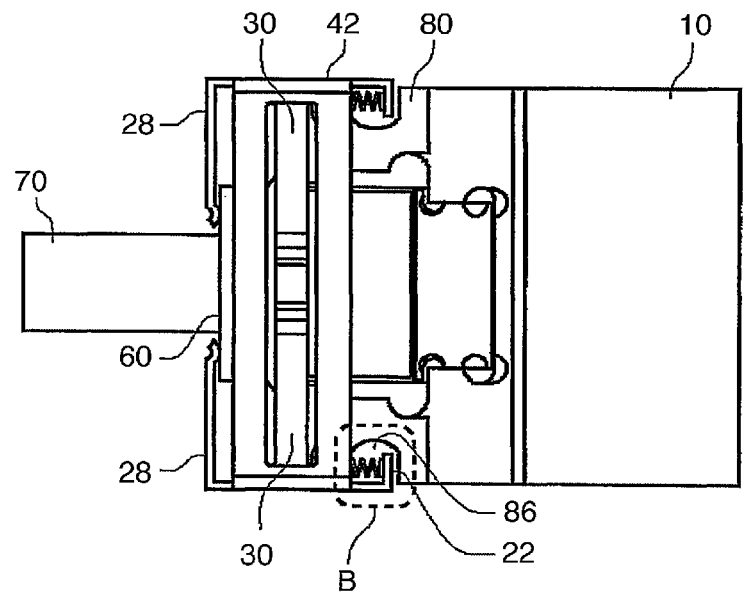
FIG. 12 are plan views showing the optical module according to the second embodiment of the present invention.
Figure 12:
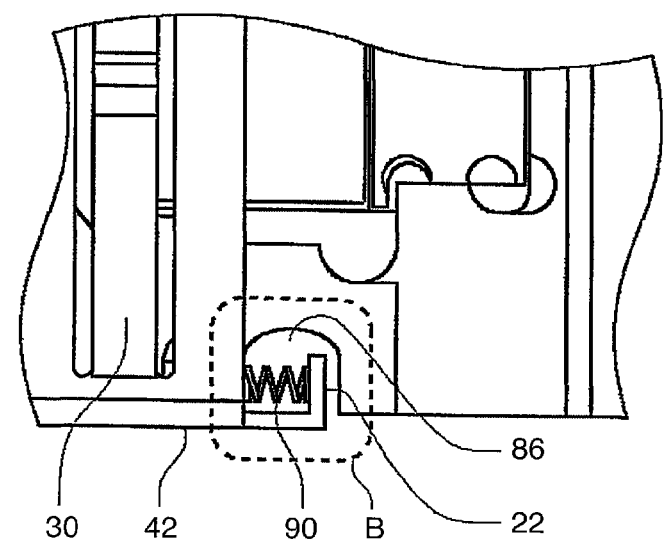

FIG. 12 are plan views of an optical module 200 according to the second embodiment of the present invention, and the whole body of the optical module 200 and an enlarged view of a region B are shown. The optical module 200 differs from the optical module 100 shown in FIG. 1 in the structure of the second fixing portion 45 and in the fixing method of the ferrule 60 in the direction of the Y-axis.

In the second embodiment, the second fixing portion 45 has the second pressing portions 28 and contact portions 22. The second pressing portions 28 are two blade springs, whose one side ends are fixed to the rear ends of the wall portions 42 and whose other side ends press the rear end of the ferrule 60. The structure of the first fixing portion 43 is the same as that of the first embodiment shown in FIG. 2, and so explanations are omitted.

The guide portions 80 of the housing 10 have the second grooves 86 at the positions corresponding to the contact portions 22. The second fixing portion 45 fixes the ferrule 60 to the housing 10 in the direction of the Y-axis as the second fixing portion 45 moves in the direction of the Y-axis.

The housing 10 has elastic bodies 90 which move the second fixing portion 45 from a second position to a first position. The second position refers to the position in the direction of the Y-axis where the second fixing portion 45 does not fix the ferrule 60 to the housing 10. The first position refers to the position in the direction of the Y-axis where the second fixing portion 45 fixes the ferrule 60 to the housing 10.

The elastic bodies 90 may be coiled springs. The coiled spring is provided inside of the second groove 86 such that the axis of the spring is parallel to the Y-axis. One end of the coiled spring is fixed to the wall surface 87 on the side of optical fiber of the second groove 86, and the other end contacts with the surface on the side of the optical fiber of the contact portion 22.

Then, a fixing method of the ferrule 60 in the optical module 200 will be explained. First, the elastic bodies 90 are compressed in the direction of the Y-axis and are kept in that state using a jig. Then, the fixing member 40 is mounted on the housing 10. At this moment, the supporting portion 32 of the first fixing member passes through the first groove 84 and the contact portion 22 of the second fixing member is held in the second groove 86. In this state, neither the first fixing member nor the second fixing member fixes the ferrule 60 to the housing 10.

Then, the jig is removed and the elastic bodies 90 are freed. The ends of the elastic bodies 90 on one side push the contact portions 22 and move the whole fixing member 40 in the direction of the Y-axis from the second position to the first position. Moving direction of the fixing member 40 is the direction from the optical fiber 70 to the housing 10 and is opposite to the moving direction shown in FIG. 7.

When the first fixing portion moves from the second position to the first position, the first pressing portions 30 press the ferrule 60 onto the placing surface 13 and the supporting portions 32 support the lower surface of the placing portion 12. Accordingly, the first fixing portion fixes the ferrule 60 perpendicularly to the placing surface 13.

When the second fixing portion moves from the second position to the first position, the second pressing portions 28 press the rear end of the ferrule 60 in the direction of the Y-axis and the contact portions 22 contact with the elastic bodies 90. Accordingly, the second fixing portion fixes the ferrule 60 in the direction of the Y-axis.

The present invention has been explained with reference to the embodiments, but the technical scope of the present invention is not limited to the scope disclosed in the above-described embodiments. It is apparent to those skilled in the art that various changes and improvements can be added to the above-described embodiments. Also, it is apparent from statements of claims that the embodiments changed or improved as described above can be included in the technical scope of the present invention.

Attention shall be paid that execution sequence of each action in operations, procedures, steps, stages, etc. of the devices, systems, programs and methods shown in claims, in the description, and in the drawings can be realized in any order, as long as the order is not specified clearly as "before" or "to precede" or the like and outputs of the preceding actions are not used in the subsequent action. Even if "first" or "next" or the like is used to explain about a processing flow in the claims, the description or the drawings for convenience, it does not mean that it is necessary to proceed in that order.

EXPLANATION OF NUMERALS

10 . . . housing
11 . . . lower surface
12 . . . placing portion
13 . . . placing surface
14 . . . optical input-output portion
16 . . . lens
18 . . . guide pin
20, 24, 26, 28 . . . second pressing portion
22 . . . contact portion
23 . . . tip
25 . . . contact surface
30 . . . first pressing portion
32 . . . supporting portion
40, 46, 47 . . . fixing member
41 . . . substrate
42 . . . wall portion
43 . . . first fixing portion
44 . . . bridge portion
45 . . . second fixing portion
50 . . . circuit board
60 . . . ferrule
62 . . . optical input-output surface
64 . . . side surface 66 ... guide hole
70 ... optical fiber
80 ... guide portion
82 ... guide surface
84 ... first groove
86 ... second groove
87 ... wall surface
90 ... elastic body
100, 200 ... optical module

The invention claimed is:

1. An optical module which combines a circuit board with an optical fiber through a ferrule, comprising:
   a housing comprising a placing portion on which the ferrule is placed and an optical input-output portion facing an optical input-output surface of the ferrule; and
   a fixing member for fixing the ferrule to the housing, wherein
   the fixing member comprises:
      two wall portions, which are provided perpendicularly to a placing surface of the placing portion, which extend parallel to each other in the direction of the Y-axis perpendicular to the optical input-output surface of the ferrule, and which face mutually;
      bridge portions, which extend parallel to the placing surface and perpendicularly to the direction of the Y-axis, and which connect together the upper ends of the two wall portions;
      supporting portions which extend from the bottom end of each of the wall portions toward the opposite wall portion;
      second pressing portions for pressing the ferrule onto the optical input-output portion in the direction of the Y-axis; and
      contact portions which extend from the inward surface of each of the wall portions toward the opposite wall portions, and
   the housing comprises:
      first grooves in which the supporting portions are inserted; and
      second grooves formed at the positions corresponding to the contact portions, wherein:
   the first grooves and the second grooves are formed, penetrating the housing in the direction of the Z-axis perpendicular to the placing surface and alongside in the direction of the Y-axis;
   the distance between the first groove and the second groove enables the supporting portions and the contact portions to pass through the grooves at the same time;
   the fixing member is movable in the direction of the Y-axis with respect to the housing;
   when the supporting portions are inserted in the first grooves from above, at least parts of the supporting portions contact with the lower surface of the placing portion; and
   the contact portions contact with the wall surfaces of the second grooves, and thus, the second pressing portions and the contact portions fix the fixing member to the housing in the direction of the Y-axis.

2. The optical module according to claim 1, wherein the housing has guide portions for guiding the side surfaces of the ferrule in the direction of the Y-axis, and the first grooves and the second grooves are formed in the guide portions.

3. The optical module according to claim 1, wherein the second pressing portions are springs whose one side ends are fixed to the ends of the wall portions of the fixing member and whose other side ends press the ferrule in the direction of the Y-axis.

4. The optical module according to claim 1, wherein an elastic body is provided inside of each of the second grooves and the elastic body pushes the contact portion in the direction of the Y-axis.

5. The optical module according to claim 1, wherein the fixing member also comprises first pressing portions for pressing the ferrule from one side in the direction of the Z-axis.

6. The optical module according to claim 5, wherein the first pressing portions are blade springs whose one side ends are fixed to the upper end portion of the wall portions of the fixing member, and the other side ends press the ferrule onto the placing surface.

7. The optical module according to claim 6, wherein the fixing member comprises two bridge portions and the blade springs are provided between the two bridge portions.

8. The optical module according to claim 1, wherein:
   the ferrule comprises at least two guide holes provided on the optical input-output surface, and
   the housing comprises:
      a lens to input and output light between the lens and the optical input-output surface of the ferrule in the optical input-output portion, and
      at least two guide pins provided in the optical input-output portion and inserted in the guide holes.

* * * * *